United States Patent [19]
Elizondo et al.

[11] 3,866,879
[45] Feb. 18, 1975

[54] WATER LEAK VALVE

[76] Inventors: David Villarreal Elizondo, Calle Sor Juana Ines de la Cruz No. 323; Armando Reyna Rendon, Calle Rio Balsas No. 411 Sur; Patrick W. MacKay Murphy, Calle Martin de Zavala No. 760 Sur, Apt. 106, all of Monterrey, N.L., Mexico

[22] Filed: Mar. 13, 1972

[21] Appl. No.: 233,978

[52] U.S. Cl. .................. 251/145, 251/146, 251/216
[51] Int. Cl. ............................................. F16k 51/00
[58] Field of Search ........... 251/145, 146, 205, 216, 251/125, 126; 285/197

[56] References Cited
UNITED STATES PATENTS

| | | | |
|---|---|---|---|
| 591,745 | 10/1897 | Du Brul | 251/216 X |
| 1,099,592 | 6/1914 | Dornin | 251/216 |
| 1,659,470 | 2/1928 | Owen et al. | 285/197 X |
| 2,010,251 | 8/1935 | Banowetz | 251/216 |
| 3,384,338 | 5/1968 | Dermody | 251/205 |
| 3,406,987 | 10/1968 | Hunder et al. | 285/197 X |
| 3,582,006 | 1/1971 | Thompson | 251/146 |
| 3,687,490 | 8/1972 | Dunmire | 285/197 |

*Primary Examiner*—William R. Cline
*Attorney, Agent, or Firm*—John C. Stahl

[57] ABSTRACT

A water leak valve adapted for use in a surface irrigation pipe comprising a member including internal threads communicating with the bore of said pipe, a valve comprising first and second sections of external threads adapted to mate with said internal threads in said member, said first section consisting of at least two complete helices, and less than one half of the external threads removed at any transverse plane along the second section whereby an opening is provided through which liquid may be metered.

1 Claim, 10 Drawing Figures

PATENTED FEB 18 1975　　　3,866,879
SHEET 1 OF 2
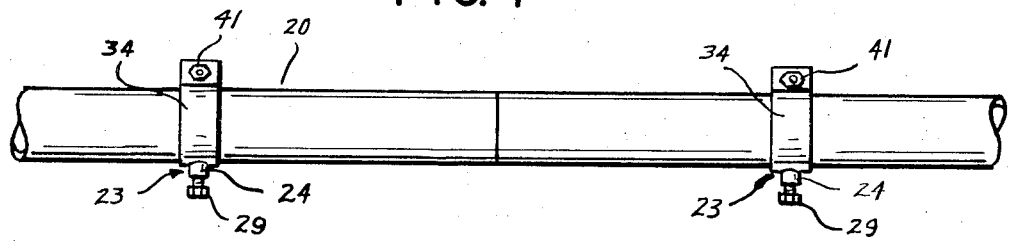
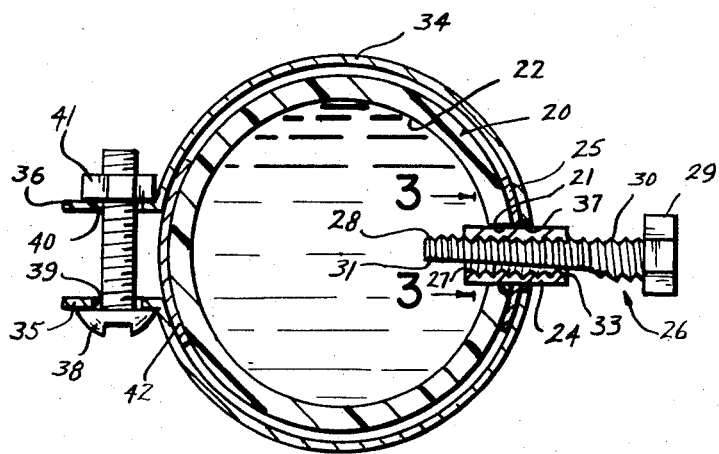
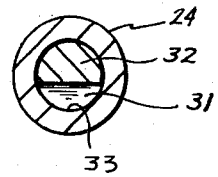
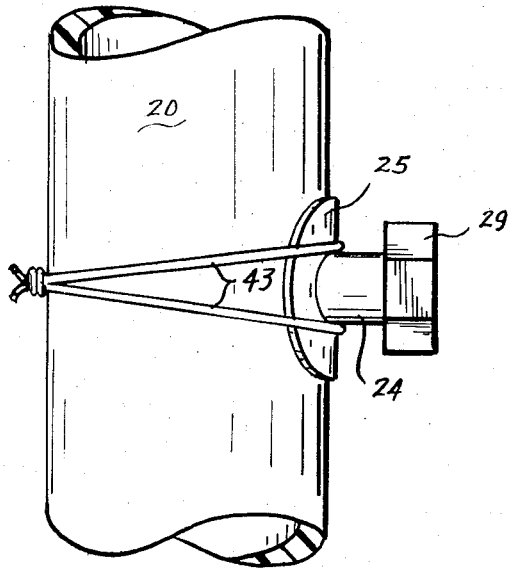
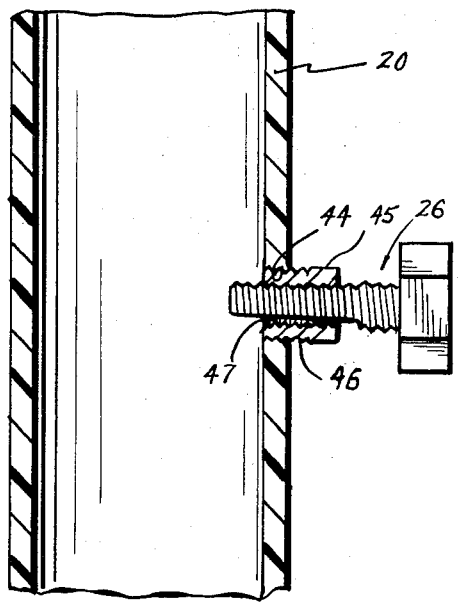

PATENTED FEB18 1975
3,866,879
SHEET 2 OF 2
FIG. 6
FIG. 7
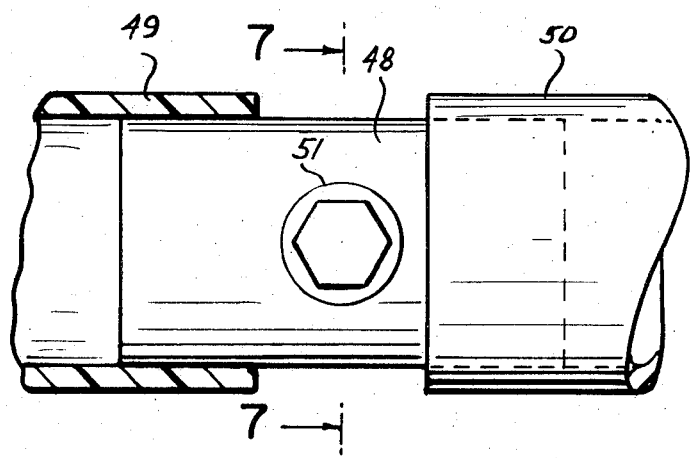
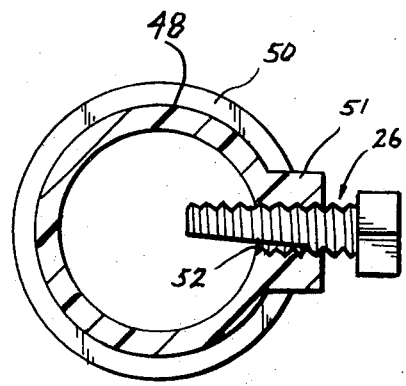
FIG. 8
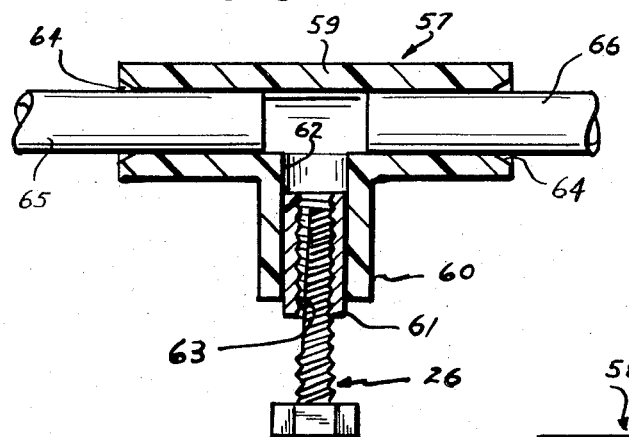
FIG. 9
FIG. 10
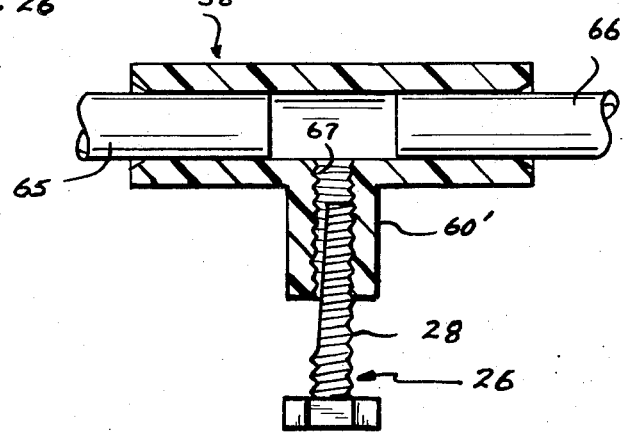

3,866,879

1

WATER LEAK VALVE

BACKGROUND OF THE INVENTION

Surface irrigation systems commonly in use employ a pipe or system of interconnected pipes for carrying water from a source of supply to the terrain or plants to be irrigated, outlets being provided to dispense the water at desired locations. Generally speaking, prior art needle-type and conical screw valves utilized in such systems have proven unsatisfactory in that sediment and incrustations interfere with the operation of said valves and obstruct the flow of water, especially at very low pressures.

SUMMARY OF THE INVENTION

It is therefore a general object of the subject invention to provide a water leak valve which may conveniently be utilized in existing surface irrigation systems or incorporated in new equipment whereby the flow can be regulated from drop-by-drop to a steady flow, as required.

Another object is the provision of a water leak valve designed to operate over wide ranges of liquid pressures.

Still another object is to provide such a water leak valve which is conveniently cleaned of sedimentation and incrustations by simply turning the valve.

A still further object is to provide a water leak valve which may conveniently be secured at any desired location in a pipe or irrigation system.

A final object is to provide such a water leak valve which is inexpensive to manufacture, capable of mass production techniques, easy to service and maintain, and is universal in its adaptability.

BRIEF DESCRIPTION OF THE DRAWINGS

FIG. 1 is a top plan view of a preferred embodiment of water leak valve secured in an elongated pipe.

FIG. 2 is a greatly enlarged, vertical sectional view, transverse to the longitudinal axis, of the preferred embodiment of the invention.

FIG. 3 is an enlarged, vertical sectional view, taken on the line 3—3 of FIG. 2, looking in the direction of the arrows.

FIG. 4 is a greatly enlarged, side elevational view showing another means of securing the preferred embodiment of water leak valve in a pipe.

FIG. 5 is a greatly enlarged, vertical sectional view of another embodiment of the invention.

FIG. 6 is a greatly enlarged, side elevational view, partly broken away and partly in section, of still another embodiment of the invention.

FIG. 7 is a vertical sectional view taken on the line 7—7 of FIG. 6, looking in the direction of the arrows.

FIG. 8 is an enlarged, vertical sectional view taken along the longitudinal axis of another embodiment of valve utilized in the practice of the invention.

FIG. 9 is a vertical sectional view through a T-fitting of the subject invention.

FIG. 10 is a vertical sectional view through another T-fitting of the subject invention.

Referring now to the drawings, wherein like reference characters designate like or corresponding parts throughout the several views, there is shown in FIG. 1 of the drawings a section or a plurality of interconnected sections of pipe 20 composed of plastic, rubber-plastic fabric or light-weight metal. Any desired number of radially extending and longitudinally spaced bores 21 (see FIG. 2) conventionally provided therein communicate with bore 22 of said pipe.

In the embodiment of FIGS. 1 and 2 of the drawings, water leak valve 23 comprises, in general, cylinder 24, disc 25, and valve 26. Disc 25, as best seen in FIG. 4, is arcuate in transverse section and conforms to the curvature of the exterior surface of pipe 20; disc 25 is fixedly secured in a conventional manner in the approximate center of said cylinder. Internal threads 27 of any thread form are provided in cylinder 24. Valve 26, including external threads 28 adapted to mate with internal threads 27, terminates outwardly in head 29. Section 30 of said external threads 28 comprise at least two complete threads or helices adjacent head 29. Inwardly of section 30, flat 31 extends longitudinally and angularly whereby less than one-half of the external threads are removed in any transverse plane along the length of said flat; said flat terminates in end 32 which comprises an area at least slightly greater than a semicircle (see FIG. 3). It is understood that when section 30 is completely threaded into internal threads 27 in cylinder 24 (see FIG. 4) the water leak valve thus formed is closed; when valve 26 is rotated approximately three turns a relatively small opening 33 occurs between flat 31 and internal threads 27 permitting liquid carried in pipe 20 to drip through said opening. Still further rotation of valve 26 creates a greater opening between such parts whereby a stream of water may pass therethrough. Obviously such water leak valve may conveniently be regulated to provide drop-by-drop flow or a steady stream of liquid at a desired and predetermined rate.

Still referring to FIG. 2 of the drawings, cylinder 24 is inserted in a selected bore 21 until stopped by disc 25 bearing against the exterior surface of pipe 20. A split metallic ring 34 terminating in laterally extending lugs 35—36 includes bore 37 intermediate said lugs to receive cylinder 24. Ring 34 is passed outwardly of pipe 20 and said ring drawn tight by means of bolt 38 passed through bore 39 in lug 35 and thence through aligned bore 40 in lug 36 with nut 41 threaded thereon. A curved metallic plate 42 is desirably placed between pipe 20 and ring 34 intermediate lugs 35, 36; it is understood that one end of said plate 42 may be fixedly secured to the inner surface to ring 34.

As viewed in FIG. 4, wire 43 or the like may be passed exteriorly of disc 25 and laterally of cylinder 24 and thence around pipe 20 any desired number of turns with the free ends twisted or otherwise fixedly secured whereby the water leak valve is maintained in bore 21.

In the modification of FIG. 5, pipe 20 of desired composition is provided with internal threads 44. Cylindrical adapter 45 is provided with external threads 46 on at least a portion thereof which are adapted to mate with threads 44. Internal threads 47 in adapter 45 accommodate valve 26 heretofore described in detail.

Referring now to FIGS. 6 and 7 of the drawings, there is shown a coupling 48 adapted to insert either internally or externally of two sections 49—50 of pipe of desired diameter and composition. More specifically, coupling 48 of desired length includes an integrally formed and laterally extending boss 51 intermediate the ends thereof. Internal threads 52 in said boss accommodate valve 26 heretofore described.

There is shown in FIG. 8 of the drawings a valve 53 constructed substantially in accordance with the principles ples heretofore described wherein an annular groove 54 in the inner surface of head 55 accommodates O-ring 56 of plastic or rubber composition. It is understood that a soft metal such as lead, alloy or the like may be deposited in said groove 54 to provide a seal when valve 26 is completely threaded into internal threads 27.

Referring now to FIGS. 9 and 10 of the drawings, there are shown T-fittings 57–58 constructed in accordance with the principles of the invention. In the embodiment of FIG. 9, fitting 57 comprises longitudinally extending pipe 59 of one internal diameter with pipe 60 of the same or a different internal diameter communicating therewith. Furthermore, it is understood that pipe 60 may either be perpendicular or at any desired angle relative to pipe 59. Cylinder 61, adapted to insert in a friction fit within bore 62 of pipe 60, includes internal threads 63 adapted to receive valve 26. Pipe 59 is desirably beveled, indicated by reference numeral 64, whereby the ends of pipes 65–66 may easily be inserted therein.

In the modification of FIG. 10, laterally extending pipe 60' includes internal threads 67 adapted to mate with external threads 28 of valve 26.

Pipe 20 heretofore described may be provided with any desired number of integrally formed, longitudinally spaced, laterally extending and internally threaded bosses similar to boss 51 or pipe 60' to accommodate valve 26 heretofore described.

It is understood, of course, that the foregoing disclosure relates to only preferred embodiments of the invention and that it is intended to cover all changes and modifications of the examples of the invention herein chosen for the purposes of the disclosure which do not constitute departures from the spirit and scope of the invention.

What is claimed is:

1. In a surface irrigation system consisting of at least one pipe including a longitudinally extending bore and at least one communicating and radially extending bore, a water leak valve comprising a member including a longitudinally extending bore terminating at opposing ends in first and second openings with at least the portion of said bore adjacent said second opening provided with internal threads, an outwardly extending flange on said member, said member inserted in said radially extending bore in said pipe until stopped by said flange, said first opening in said member communicating with said longitudinally extending bore in said pipe, said member secured in said pipe by transversely extending means at least partially passed around said pipe and at least partially passed around said flange, a valve comprising first and second sections of external threads, said first section comprising at least two complete helices, said second section comprising a longitudinally extending and angularly inclined flat with not less than one half of each of said external threads removed at any transverse plane along the length of said second section whereby adjustment of said valve provides an opening between said flat of said valve and said second opening in said member through which liquid may be metered.

* * * * *